United States Patent
Kulaga et al.

(10) Patent No.: US 8,250,540 B2
(45) Date of Patent: Aug. 21, 2012

(54) SYSTEM AND METHOD FOR ADMINISTRATION OF MOBILE APPLICATION

(75) Inventors: Andrey A. Kulaga, Moscow (RU);
Damir R. Shiyafetdinov, Moscow (RU);
Andrey V. Kazachkov, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 1435 days.

(21) Appl. No.: 11/778,186

(22) Filed: Jul. 16, 2007

(65) Prior Publication Data
US 2009/0024992 A1 Jan. 22, 2009

(51) Int. Cl.
*G06F 9/44* (2006.01)
*G06F 11/00* (2006.01)

(52) U.S. Cl. ........... 717/126; 717/100; 717/127; 726/24
(58) Field of Classification Search .................. None
See application file for complete search history.

(56) References Cited

U.S. PATENT DOCUMENTS

| | | | |
|---|---|---|---|
| 6,947,986 B1 | 9/2005 | Huang et al. | |
| 7,065,533 B2 | 6/2006 | Arrouye et al. | |
| 7,467,370 B2 * | 12/2008 | Proudler et al. | 717/100 |
| 7,603,712 B2 * | 10/2009 | Seinfeld et al. | 726/24 |
| 7,703,078 B2 * | 4/2010 | Radatti et al. | 717/127 |
| 7,873,947 B1 * | 1/2011 | Lakhotia et al. | 717/126 |
| 8,099,785 B1 * | 1/2012 | Pavlyushchik | 726/24 |
| 2003/0192033 A1 * | 10/2003 | Gartside et al. | 717/126 |
| 2005/0288961 A1 * | 12/2005 | Tabrizi | 705/1 |
| 2006/0075070 A1 * | 4/2006 | Merissert-Coffinieres et al. | 709/218 |
| 2008/0010243 A1 * | 1/2008 | Weissman et al. | 707/2 |
| 2008/0162679 A1 * | 7/2008 | Maher et al. | 709/223 |
| 2009/0024992 A1 | 1/2009 | Kulaga et al. | |
| 2010/0064341 A1 * | 3/2010 | Aldera | 726/1 |
| 2012/0084759 A1 * | 4/2012 | Candea et al. | 717/126 |

OTHER PUBLICATIONS

Higby et at., Wireless security patch management system, Oct. 2004, 4 pages, <http://delivery.acm.org/10.1145/1030000/1029575/p165-higby.pdf>.*

Ye et al., IMDS: intelligent malware detection system, Aug. 2007, 5 pages, <http://delivery.acm.org/10.1145/1290000/1281308/p1043-ye.pdf>.*

\* cited by examiner

*Primary Examiner* — Thuy Dao
(74) *Attorney, Agent, or Firm* — Arent Fox LLP; Michael Fainberg

(57) ABSTRACT

An administration system and methods for mobile security and other software applications operating on mobile devices in a corporate network. The administration system comprises an administration server, administration database and administration console. To facilitate integration of mobile applications into the administration system, each mobile application is provided with an associated administration console plug-in component. The administration plug-in component provides a set of user interfaces for configuring via the administration console application configuration settings specific to the one or more associated mobile applications. In addition, the plug-in component provides web interfaces, such as SOAP interfaces, for communicating application-specific configuration settings to the associated mobile applications. Accordingly, the administration system enables rapid and highly concurrent installation, configuration, updating, and patching of various mobile applications without modifying infrastructure of the administration system.

20 Claims, 5 Drawing Sheets

SYSTEM AND METHOD FOR ADMINISTRATION OF MOBILE APPLICATION

TECHNICAL FIELD

The present disclosure relates generally to a system and methods for administration of software applications, and in particular, to remote installation, configuration and management of mobile security and other applications residing on mobile devices.

BACKGROUND

Modern corporate networks include thousands of servers, user workstations and mobile devices interconnected into local and wide area networks and operating hundreds of various software applications around the clock. Administration of complex computer networks is a difficult task, which requires a versatile and a well-organized application administration system. For example, such an administration system facilitates installation, configuration and management of various software applications not only on the user workstations but also on the myriads of various mobile devices in the corporate network, such as laptop computers, smart phones, personal digital assistants (PDAs) and the like. The system has to be responsive to frequent changes and updates of software applications. Typically, addition of new software applications or upgrade of old software applications requires modification of the administration system to enable integration of the software applications into the administration system. This places a heavy burden on the administrative infrastructure of the corporate network and makes application administration task, even more onerous.

The difficulties of application administration in large corporate networks are particularly severe in connection with various security applications. A proper operation of security applications on user workstations and mobile devices is essential to the safety of the corporate network and integrity of corporate information. Therefore, security applications are frequently updated to keep up with the ever-growing spread of computer and network security threats, such as viruses, hacker attacks, spam, spyware and the like. These application modifications often require frequent changes in the application administration system as well. In particular, the administration system must be quickly modified to recognize, install and configure the newly added security applications to assure continuous protection of the corporate network. Therefore, there is a need for a centralized administration system that provides rapid and highly concurrent installation, configuration, updating, and patching of remote security and other applications operating on the user workstations and mobile devices in the corporate network.

OVERVIEW

Disclosed are system and methods for remotely administering mobile software applications, and in particular, security applications. The disclosed system and methods provide for dynamic connection to and integration of various mobile applications into application administration system of the existing corporate network infrastructure, as well as facilitate development of the application administration system and various mobile applications independent of each other. The administration system does not require modification of its configuration and operation for every administered mobile software application. Integration of the mobile applications into the administration system may be based on available administrative interfaces of the mobile application. A single administration system created on the bases of existing various mobile applications, each of which is independently generated and provides various interfaces for external administration. The administration system may thus be viewed as a global integrator of mobile applications.

In an example embodiment, an administration system for one or more mobile software applications includes an administration server operable to administer configuration settings for one or more mobile applications. The administration server uses a web-based communication protocol to communicate with the one or more mobile applications. The system also includes an administration database connected to the administration server. The administration database stores one or more application configuration settings. The system further includes an administration console connected to the administration server. The administration console provides a first user Interface for configuring application configuration settings common to a plurality of mobile applications. The system also includes an administration console plug-in component associated with one or more mobile applications. The plug-in component provides (i) a second user interface for configuring via the administration console application configuration settings specific to the one or more associated mobile applications, and (ii) one or more web interfaces for communicating the one or more application-specific configuration settings to the associated mobile applications.

In an embodiment, the mobile application may comprise a mobile security application. At least one of the first user interface and the second user interface may comprise a web-based user interface. The web-based communication protocol may comprise a Simple Object Access Protocol (SOAP). The plug-in component-generated web interfaces for communicating application-specific configuration settings may include SOAP interfaces as well. In one embodiment, the application administration plug-in component uses the one or more web interfaces to directly communicate the one or more application-specific configuration settings to the associated mobile applications. In another embodiment, the application administration plug-in component communicates the one or more application-specific configuration settings to the administration server and one or more of the associated software applications retrieves from the administration server the one or more application-specific configuration settings using the one or more web interfaces.

In another embodiment, a method for administering a mobile application comprises providing via an administration console a first user interface for configuring one or more application configuration settings common to a plurality of mobile applications; receiving via the first set of user interfaces one or more common application configuration settings; providing via an administration console plug-in component associated with the mobile application a second user interface for configuring one or more application settings specific for the mobile application; receiving via the second set of user interfaces one or more application-specific configuration settings; and sending to the mobile application via one or more web interfaces of the administration console plug-in component the received one or more application-specific configuration settings. The method also comprises sending to the mobile application via one or more common web interfaces the received one or more common application configuration settings. The method further comprises storing in an administration datastore the received one or more common application configuration settings. The method may further comprise receiving from the mobile application a request for one or more common application configuration settings; in response, retrieving from the administration datastore the requested one or more common application configuration settings; and sending the retrieved common application configuration settings to the mobile application using one or more common web interfaces.

In another embodiment, disclosed is a computer readable medium comprising computer executable instructions for installing a security application on a mobile device; installing an administration console, which provides a first user interface for configuring one or more application settings common to a plurality of security applications; and installing an administration console plug-in component associated with the security application, wherein the plug-in component provides (i) a user interface for configuring via an administration console application configuration settings specific to the security applications, and (ii) one or more web interfaces for communicating the one or more application-specific configuration settings to the mobile application. At least one of the first user interface and the second user interface may comprise a web-based user interlace. A web interface for communicating application-specific configuration settings may comprise a SOAP interface.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
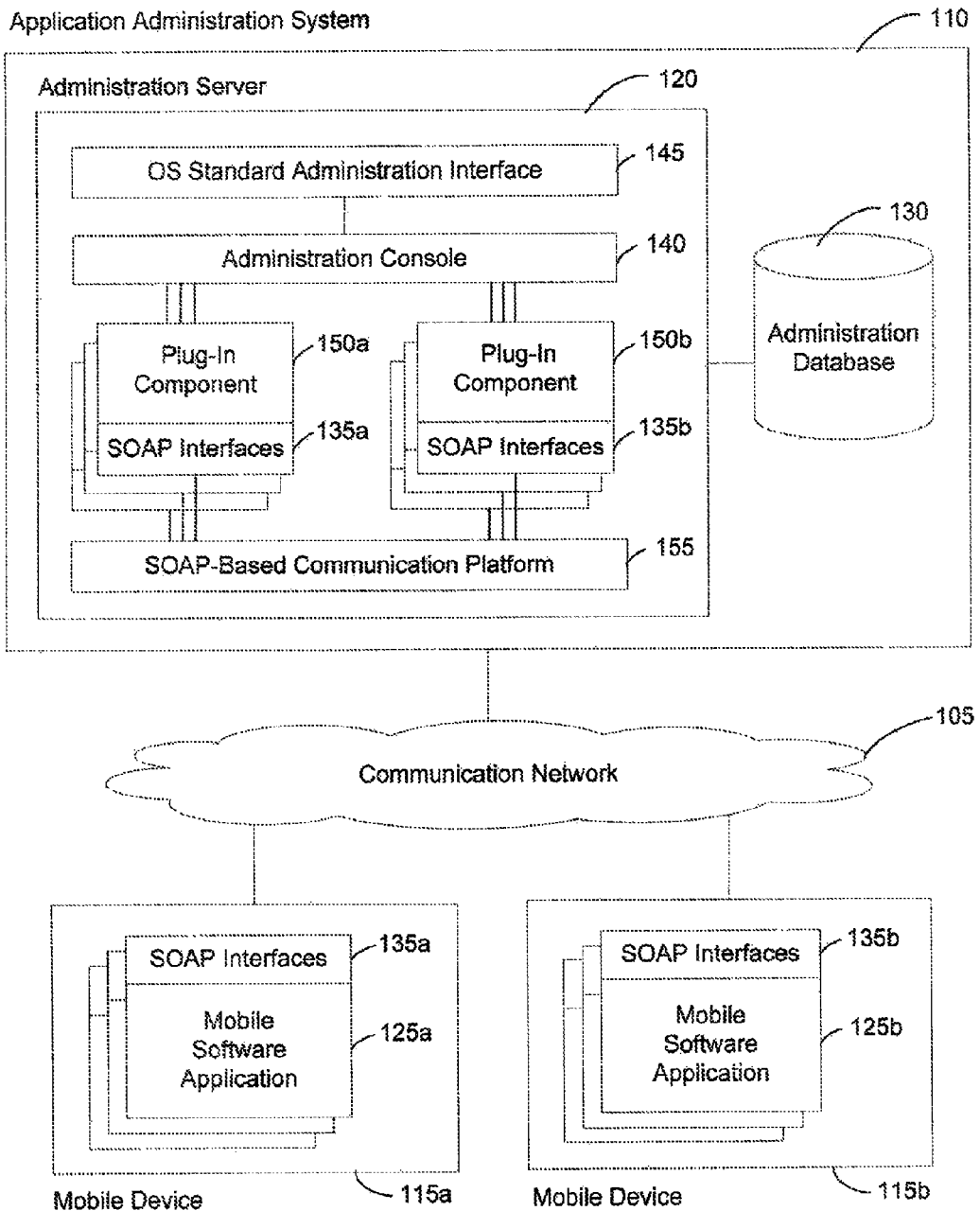
FIG. 1 is a network diagram depicting an administration system for mobile applications in accordance with an example embodiment.

FIG. 1 is a schematic diagram depicting a computer network 100 in which various embodiments of a software administration system may be implemented. As shown, the computer network 100 comprises an application administration system 110 connected over a communication network 105 to a plurality of mobile devices 115, which execute mobile software applications 125. In one embodiment, the administration system 110 may comprise an administration server 120 and administration database 130. Mobile devices 115 may include various laptop and tablet computers, pocket PCs, smart phones, personal digital assistants (PDAs) and the like. The communication network 105 may comprise a home network, a corporate intranet, a virtual private network (VPN), the Internet or other types of local and wide area networks, which may include wired, wireless or cellular networks, such as Ethernet, Wi-Fi, GSM, PCS or any combination thereof. The components of the computer network 100 may be interconnected via various network devices, such as base stations, routers, switches, etc. and may communicate with each other using any of a variety of network protocols.

In an embodiment, a mobile device 115 may comprise a processor, a memory, input/output devices, a network interface device and various peripheral devices all of which may be interconnected by a data bus. The processor may include, for example, an Intel® Core™ or Pentium® M processors, a AMD Turion™ 64 processor or various ARM architecture-based processors that are commonly used in mobile devices, such as smart phones and the like. The memory may comprise, for example, a random access memory (RAM), a read only memory (ROM), a programmable ROM (PROM), an erasable PROM (EPROM), a FLASH-EPROM and other types of dynamic, volatile and nonvolatile information storage medium. The data input devices may include, for example, a keyboard or a pointing device, such as a mouse or a trackball. The data output device may include a display device, such as a LCD monitor, which may include a touch screen display overlay. The network interface device may include, for example, wired or wireless Ethernet interfaces, such as IEEE 802.3 and IEEE 802.11 network cards, or cellular network interface, such as a GSM or CDMA network card. Lastly, the peripheral devices may include printers, scanners, disk drives, tape drives, speakers and other devices. The mobile device 115 may be run by an operating system (OS), such as Windows Mobile®, Symbian OS® or other operating systems suitable to operate mobile devices.

In an embodiment, a mobile device 115 may include one or more security and/or other software applications 125 (mobile applications). For example, a software application 125 may include a security application, such as Kaspersky® Anti-Virus Mobile, for protecting the mobile device 115 from viruses, hacker attacks, spam, spyware and other security threats. In one embodiment, software applications 125 may be installed on the mobile devices 115 by a computer user. In another embodiment, software applications 125 may be remotely installed by the system administrator using methods described herein. In an embodiment, software applications 125 may communicate with the administration system 110 using Simple Object Access Protocol (SOAP) interfaces 135. The SOAP is a platform-independent communication protocol that uses XML as mechanisms for the information exchange and an Internet application layer protocol, such as HTTP or secure HTTP (HTTPS), as an underlying transport protocol. Using SOAP interfaces 135, software applications 125 are synchronized with the administration system 110, to receive various configuration settings, tasks and policies and return to the administration system 110 information on the status of system security, event notifications and statistics about operation of software applications 125.

In an embodiment, the administration system 110 may comprise an administration server 120, which facilitates centralized administration of various software applications 125 installed on mobile devices 115. The administration server 120 may be implemented in a Windows® or Unix-based computer system. It includes computer executable programming instructions for installation, configuration and management of software applications 125 on the mobile devices 115 and other devices in the computer network 100. In one embodiment, the administration sever 120 uses a SOAP-based communication platform 155 to exchange information common to all software applications 125. The server 120 may also maintain an administration database 130 for storing information about software applications 125. The administration database 130 may store, for example, application configuration setting, operating tasks and policies, antivirus libraries, information on the status of system security, reported events and various statistics on the execution of applications 125 and other information. The database 130 may be implemented using a SQL-based relational database management system, such as an Microsoft® SQL server, MySQL®, Oracle® database or the like.

The functionality of the administration server 120 includes, but is not limited to:

Scanning the devices on the computer network 100 and in particular its domain controllers to obtain information about registered mobile devices 115 and other network devices;

Saving information about identified mobile devices 115 and other network devices in the administration database 130 and maintaining that the saved information be accurate and complete;

Maintaining network configuration information and various network and system settings;

Facilitating installation and upgrade of software applications 125 on mobile devices 115;

Maintaining software license key information and distributing it to mobile devices 115;

Controlling operating tasks and group policies for software applications 125, such as information on the type and schedule of antivirus scans of mobile devices 115 and the like;

Maintaining antivirus libraries up to date and regularly distributing updated antivirus definitions to software applications 125; and Collecting information about operation of software applications 125, processing the collected information and notifying the network administrator of application operations.

In an embodiment, the administration sever 120 may include an administration console 140, which provides a system administrator with an administrative interface, such as a graphical user interface (GUI). The console 140 enables the system administrator to control all the functional features of the administration server 120, including but not limited to those listed above. In particular, the system administrator can install, configure, update and patch remote security and other applications operating on servers, clients and other network devices in the corporate network 100 via the administration console 140. The console 140 may be operated on the administration server 120 or another computer in the computer network 100 or outside. In an embodiment, the administrative console 140 may be implemented as a component to the operating system's standard administration interface 145. In an exemplary embodiment, the administration console 140 may be implemented as a module, e.g., snap-in, of the Microsoft Management Console (MMC) of the Microsoft Windows® OS operating the administration server 120 or another Windows-based computer system on which console 140 is implemented. In particular, the administration console 140 may utilize MMC application program interfaces (APIs) to access various administrative features of MMC.

In an embodiment, the administration console 140 allows a system administrator to control various configuration and operating parameters common to various mobile applications 125. For example, the system administrator may configure common application settings, which include various operating parameters of software applications 125, such as network address/port of the administrative server 120 and antivirus libraries, license key information, types of notifications to be sent to the administration server 120 and other types of common application settings. The system administrator may also configure various common operating tasks, such as the frequency of antivirus updates and schedule of antivirus scans on mobile devices 115. The system administrator may also specify various common operating policies, which include sets of settings and/or tasks shared by a group of mobile devices 115, such as the types of events, whose occurrence should be reported to the administration system 110. The administration console 140 may also receive from the administration server 120 statistical information provided by the software application 125, such as the number of viruses detected and the like.

To facilitate administration of various software applications 125 via the administration console 140 without modifying configuration of the administration system 110, each of the software applications 125 may be provided with a corresponding application administration plug-in component 150 according to one example embodiment. The plug-in components 150 may be implemented to operate in the address space of MMC console 145 in accordance with one example embodiment to facilitate integration of application administration plug-in components 150 into the console 140. In one embodiment, administration plug-in components 150 may be dedicated to execution of application-specific administration settings and tasks related to one or more associated software applications 125. In particular, an administration plug-in component 150 may provide (i) customized user interfaces for configuring application-specific settings of software application 125 via the administration console 140 and (ii) custom web interfaces for communicating application-specific information to the various software application 125. In this manner, the administration system 110 provides a centralized and uniform means for managing various mobile software applications 125.

In one embodiment, application administration plug-in components 150 provide user interlaces for installing, configuring and managing the work of software applications 125 on the mobile devices 115 via the administration console 140. For example, plug-in components 150 may provide interfaces, e.g., dialog windows, that enable the system administrator to remotely install and/or upgrade software applications 125 on mobile devices 115. Plug-in components 150 may provide application-specific interfaces for configuring application settings, tasks and policies. Plug-in components 150 may provide information about the events generated by the applications 125, such as, events associated with detection and repair of a virus on mobile device 115. They may facilitate display of information on the administration console 140 received from mobile devices 115 about various statistics of operation of software applications 125, such as, information on a status of antivirus protection of mobile devices 115 and the like. Those skilled in the art may recognize that the functionality of application administration plug-in components 150 is not limited to that described above, but may include other functions in various embodiments.

In another embodiment, application administration plug-in components 150 provide communication between the administrative server 120 and various software applications 125. Such a communication may be implemented using one or more application-specific SOAP interfaces 135. SOAP interfaces 135 are designed to seamlessly integrate into the architecture of the SOAP-based communication platform 155 thereby enabling the administration server 120 to communicate with various software applications 125. An implementation of SOAP interfaces 135 may depend, for example, on the type and functionality of the corresponding software application 125 in accordance with an example embodiment. Thus, a first software application 125a may communicate with its corresponding administration plug-in component 150a using a first set of application-specific SOAP interfaces 135a, while a second software application 125b may communicate with its corresponding plug-in component 150b using a second set of application-specific SOAP interfaces 135*b*. The SOAP-based communication platform may provide interfaces common to both the first and second software application 125*a*, 125*b*. In this manner, application administration plug-in components 150 allow integration of various software applications 125 into the administration system 110.

To facilitate SOAP-based communication, an administration information exchanged between the administration system 110 and software applications 125 may be encoded in XML format. The Extensible Markup Language (XML) is a general-purpose markup language suitable to create common information formats and share both the format and the data over the connection, particularly via the Internet. The latest XML specification is available from the W3C website (http://www.w3.org/TR/REC-xml). In one embodiment, the administration console 140 may generate a Web-based administrative interface, such as XML-based webpages. In the Web-based interlace, software administration data, such as various configuration settings, tasks, group policies and the like are XML formatted and may be directly communicated by an administration plug-in component 150 to the corresponding software application 125 using SOAP messages. In another embodiment, the administrative interface may not be Web-based and the administration data may be coded using languages other than XML, such as C++, Visual Basic or Java, in which case the plug-in component 150 may map the administrative data into XML format using methods known to those of skill in the art and send the XML encoded information to the software application 125 using SOAP messages.

In an embodiment, to facilitate installation of software applications 125 on mobile devices 115, the administration system 110 may provide a remote application-installation packages. In one embodiment, the system 110 may provide to a mobile device 115 a uniform recourse locator (URL) to a remote installation package, e.g., a self-executable installation file. The remote installation package may be stored on the administration server 120 or elsewhere. The mobile device 115 may download and execute the remote installation package, which installs and configures a software application 125 on the mobile device 115. In another embodiment, the administration system 110 provides a remote installation package to a user workstation (not depicted) associated with the mobile device 115. The remote installation package executes on the user workstation and wait for the mobile device 115 to be connected to the workstation via a physical link, e.g., USB, FireWire or the like. When the mobile device 115 is detected, the remote installation package installs and configures a software application 125 on the mobile device 115. The initial configuration settings allow the application 125 to connect to the administration server 120 to obtain additional configuration information.

To communicate with a newly installed software application 125, the administration server 120 may need to determine the corresponding administration plug-in component 150 based on the software application type identifier in accordance with one example embodiment. An application type identifier may include the following information: the name of a software application, e.g., Kaspersky® Anti-Virus Mobile, and the software version number, e.g., version 5.0.101. The application type identifier may be the same for all compatible applications 125, e.g., any applications that have similar configuration settings. In an embodiment, compatible applications 125 may be controlled by the same administration plug-in component 150. In other words, if two versions of a software, application 125, e.g., any old version (5.0.101) and a new one (5.0.102), have the same application type identifier, they have compatible settings and thus may be controlled by the same administration plug-in component 150, e.g., plug-in version 5.0.102. However, if the two versions of software application 125 have incompatible settings, they have different application type identifiers and may be controlled by different plug-in components 150, e.g., a plug-in component version 5.0.101 and a plug-in component version 5.0.102, respectively.

Figure 2:
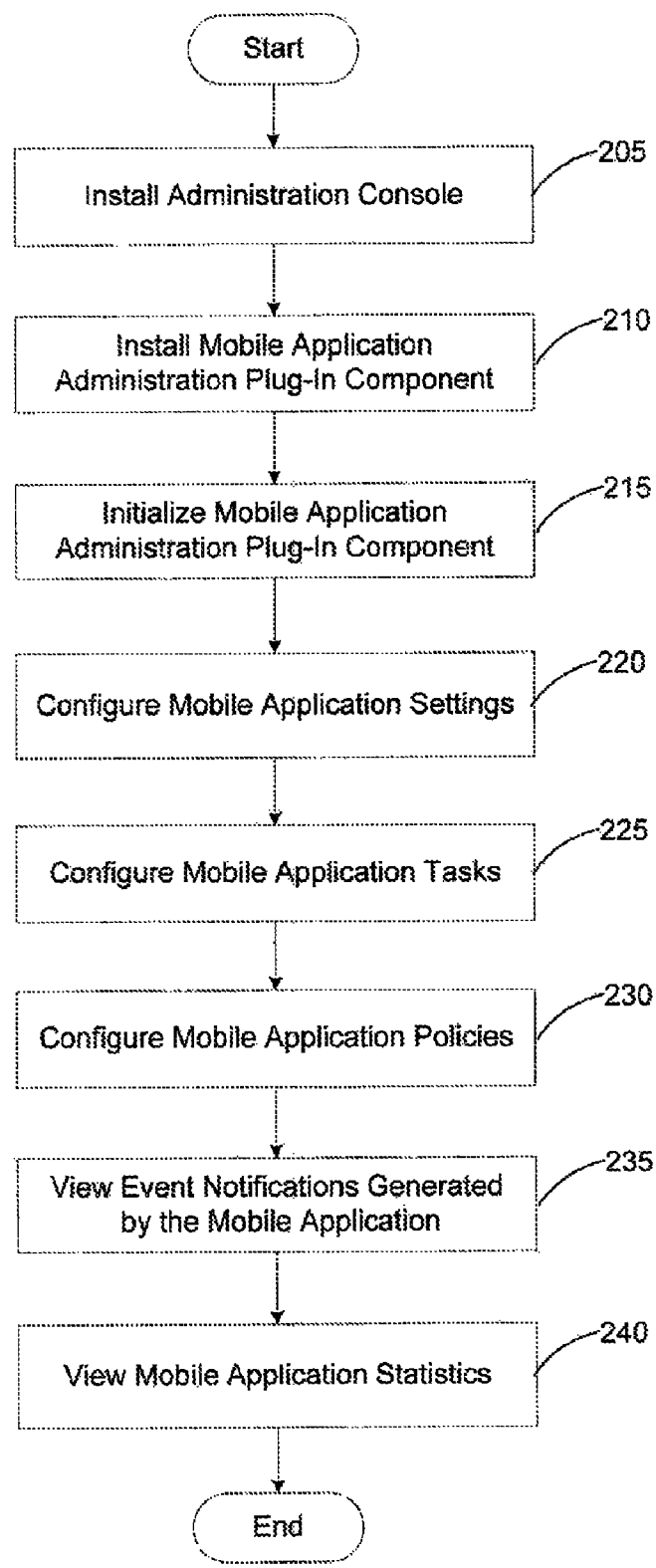
FIG. 2 is a flowchart illustrating a process of integration of mobile applications into the administration system in accordance with one example embodiment.

FIG. 2 depicts a process of integration of various mobile software applications into an application administration system in accordance with an example embodiment. Initially, a system administrator may install an administration console on the administrator's workstation, e.g., an administration server, step 205. The system administrator may then install an application administration plug-in component on the administrator's workstation, step 210. The plug-in component enables the administration server to recognize and communicate with the various software applications installed on the mobile device and allows the system administrator to control these software applications via the administration console. The administration console initializes the plug-in component by updating the OS registry of the administrative server with the application-related information, step 215. In particular, the new registry entries may include, but are not limited to, an application type identifier associated with the given plug-in component, a list of identifiers of different tasks executable by the associated software applications, a list of identifiers of different events generated by the associated software applications and the like.

Once the plug-in component is initialized, the system administrator may view and edit via the administration console configuration information stored on the administration server about various software applications associated with the initialized plug-in component. At step 220, the system administrator may view and edit application settings, including, but not limited to, administrative server settings, such as network address/port information, antivirus library settings, license key settings and event notification settings. At step 225, the system administrator may also view and edit application's tasks, including, but not limited, to, antivirus update tasks, schedule of antivirus scans, real-time antivirus protection tasks, etc. At step 230, the administrator may view and edit software application policies, such as settings and/or tasks shared by a group of mobile devices. Policies may include, but are not limited to, antivirus protection policies, event notification policies and the like. The administrator may also view a list of event notifications generated by the software application and reported to the administration server, step 235. Event notifications may include, but are not limited to, notifications of detected system attacks, cured system threats and found and deleted viruses. At step 240, the administrator may also view statistical information about the operation of the software application, such as the total number of detected viruses and system attacks and the like.

Figure 3:
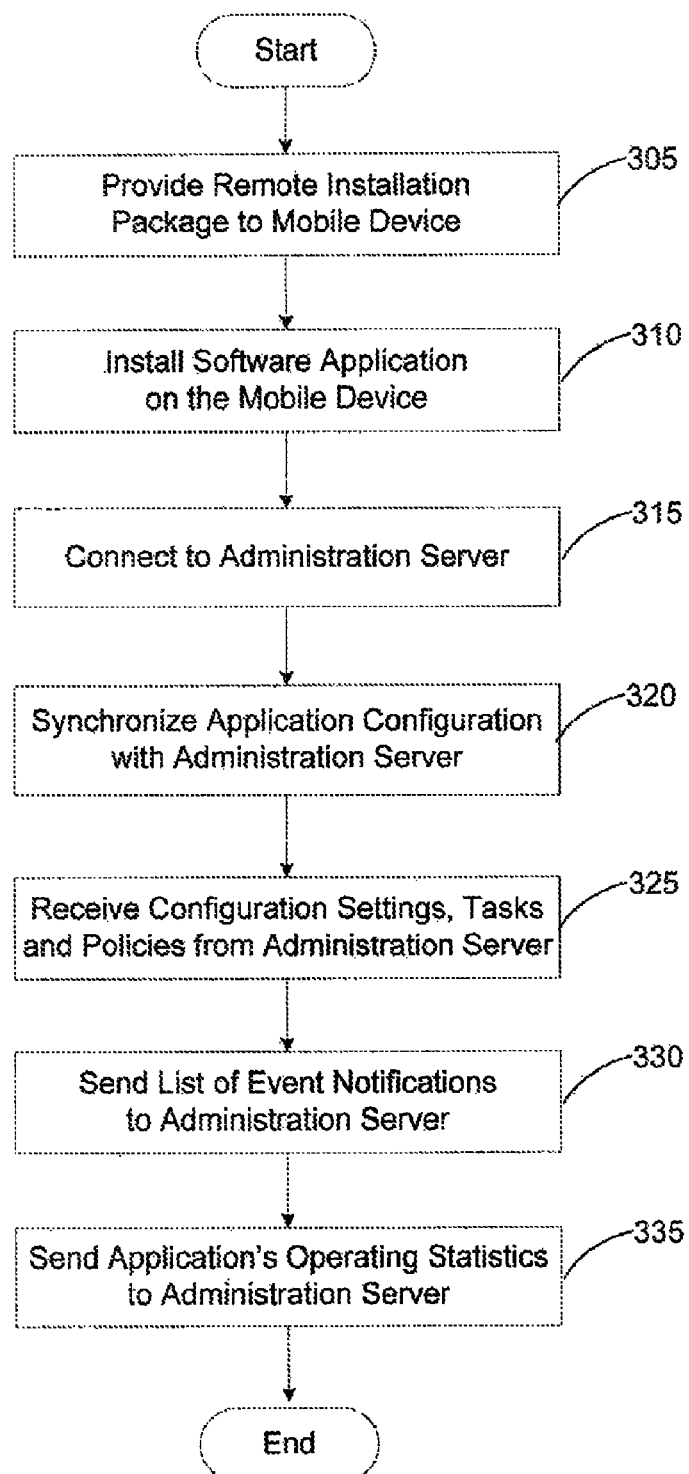
FIG. 3 is a flowchart illustrating a process of integration of mobile applications into the administration system in accordance with another example embodiment.

FIG. 3 depicts a process of integration of various mobile software applications into the application administration system in accordance with an example embodiment. At step 305, a system administrator distributes a remote installation package of the software application to one or more mobile devices. When executed on a mobile device, the remote installation package installs and configures a software application on the mobile device, step 310. After installation, the software application uses its initial configuration settings to connect to the administration server, step 315. Once the connection is established, the software application is synchronized with the administration server, step 320. During synchronization, the software application may provide information about the application, such as its installation date, its upgrade date, license information, and information on the status of the application, such as whether application has been enabled or disabled, the date when the last antivirus scan was performed on the mobile device and other. In response, the administration server may provide to the software application its configuration information, including, but not limited to, settings, tasks, and policies, step 325. The software application may then transmit event notifications generated by the application to the administration server, step 330. Lastly, the software application may also transmit to the server various statistical information, step 335.

Figure 4:
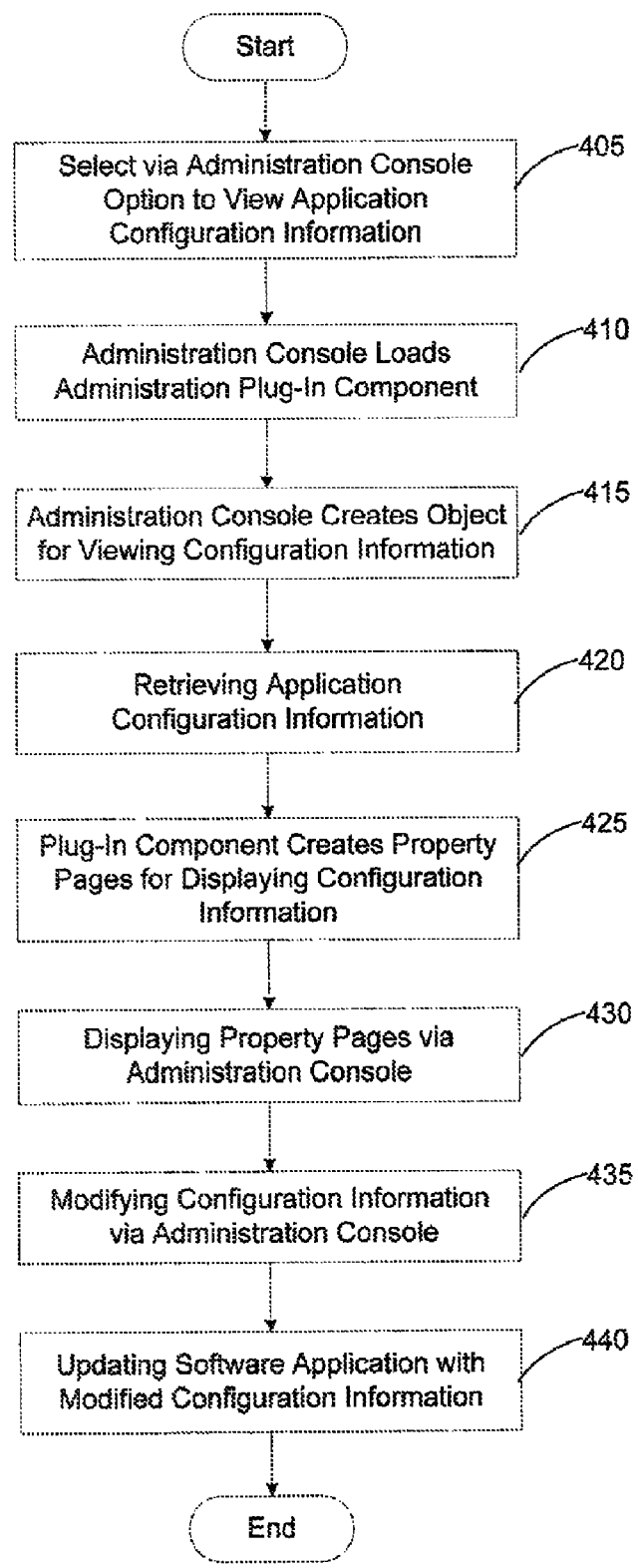
FIG. 4 is a flowchart illustrating a process of configuring mobile applications in accordance with one example embodiment.

FIG. 4 depicts a process of viewing and editing mobile software application configuration information, e.g., settings, tasks or policies, in accordance with one example embodiment. In the administration console, the system administrator selects an option to view application configuration, e.g., setting, tasks or policies, step 405. The MMC console loads an application administration plug-in component associated with the software application, step 410. The MMC console creates an object for viewing and editing application configuration information, step 415. In one embodiment, the MMC console may retrieve application configuration information from the administration server, step 420a. In another embodiment, the administration plug-in component may retrieve application configuration information directly from the software application using common or application-specific SOAP interfaces, step 420b. The plug-in component may then create one or more property pages for viewing application configuration information, step 425. The system administrator may view and edit application configuration information, such as settings, tasks or policies, using property pages, step 430. The MMC console receives the modified application configuration information and stores it on the administration server, step 435. In one embodiment, the plug-in component may then directly transfer the modified configuration information to the software application using common and/or application-specific SOAP interfaces, step 440a. In another embodiment, the modified configuration information may be transferred to the software application during the subsequent synchronization with the administration server, step 440b.

Figure 5:
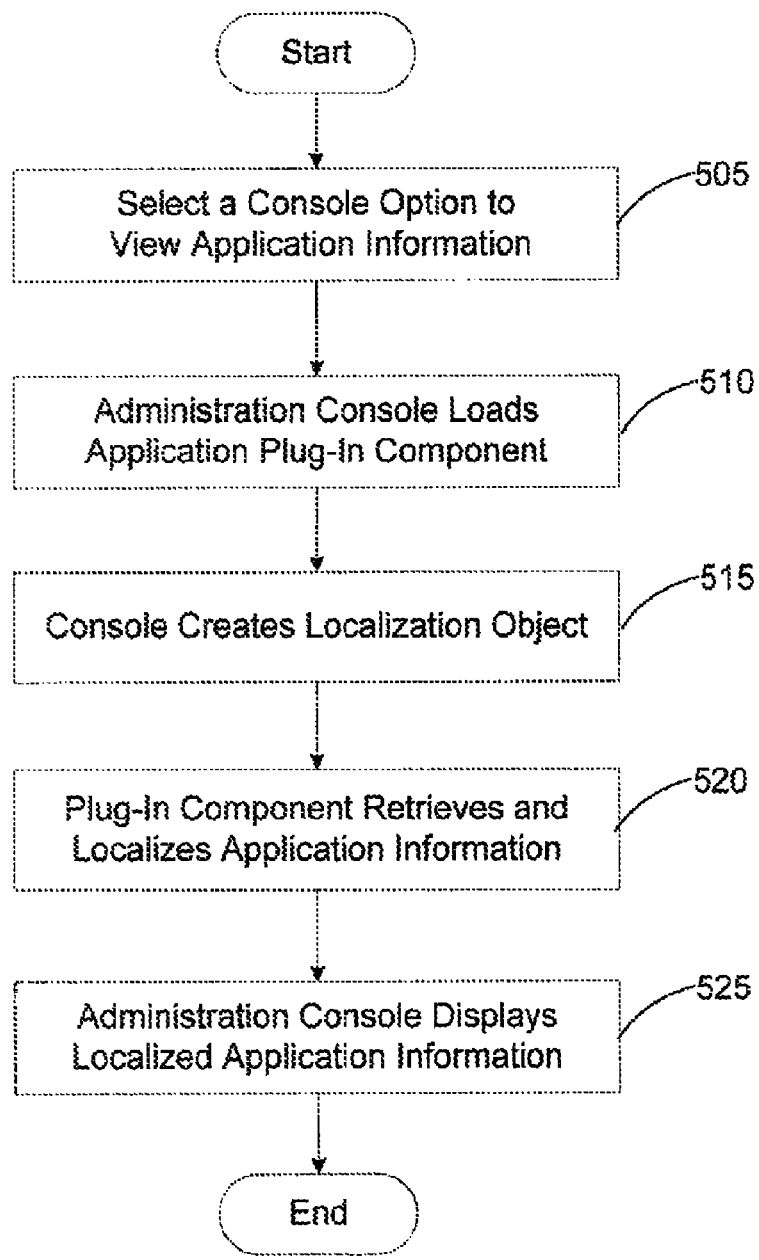
FIG. 5 is a flowchart illustrating a process of reviewing information about operation of mobile applications in accordance with an example embodiment.

FIG. 5 depicts a process of viewing information, e.g., event notifications and operational statistics, about operation of mobile software applications in accordance with one example embodiment. In the administration console, the system administrator selects an option to view application information, e.g., event notifications or operational statistics, step 505. The MMC console loads an application administration plug-in component associated with the software application, step 510. The MMC console creates an object for localization of the application information, step 515. The MMC console invokes a method provided by the administration plug-in component to localize, e.g., event notifications and operational statistics, retrieved from the software application using common and/or application-specific SOAP interfaces and returns the localized data to the MMC console, step 520. The MMC console displays the localized information to the administrator via the administration console, step 525.

In sum, the disclosed example embodiments of the application administration system enable dynamic connection and integration of various mobile applications into existing corporate network infrastructure, and facilitate development of various mobile applications independent of each other. The administration system does not require modification of its configuration and operation to suit every administered mobile software application. Integration of mobile applications into the administration system may be based on the preexisting and available administrative interfaces of the mobile application. A single administration system created on the bases of existing mobile applications, each of which is independently generated and provides disparate interfaces for external administration. The administration system may thus be viewed as a global integrator of mobile applications.

FIGS. 1-5 are conceptual, illustrations of various example embodiments of the disclosed system and methods. Unless explicitly stated herein otherwise, the ordering or arrangement of the steps and/or components should not be limited to the descriptions and/or illustrations hereof. It is understood that various aspects of the embodiments of the administration system disclosed herein could be implemented in hardware, firmware, software or their combination. In such an embodiment, the various components and/or steps would be implemented in hardware, firmware, and/or software to perform the software administration functions. That is, the same piece of hardware, firmware or module of software may perform one or more of the illustrated functions (e.g., components or steps). In other words, in the present specification, an embodiment showing a singular component should not necessarily be limited to other embodiments including a plurality of the same component, and vice-versa, unless explicitly stated otherwise.

In various embodiments, software applications (e.g., programs or other instructions) and/or data may be stored on a machine readable medium as part of a computer program product, and loaded into a computer system or other device or machine via a removable storage drive, hard drive or communications interface. Software applications may be implemented by any programming or scripting languages, such as Java, JavaScript, Action Script, C++, Pearl, Visual Basic, XML or other. Software applications (also called a computer control logic or computer readable program code) may be stored in the main and/or secondary memory, and executed by one or more processors (controllers, or the like) to cause the one or more processors to perform the functions of the various embodiments as described herein.

Furthermore, it is to be understood that the phraseology or terminology herein is for the purpose of description aid not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompasses present and future known equivalents to the known components referred to herein by way of illustration.

While various embodiments have been described herein, it is understood that they have been presented by way of example, and not limitation. It would be apparent to skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method for administering antivirus applications, the method comprising:
providing via an administration console of an administration server a first administrative interface for administering and controlling configuration settings, antivirus scan tasks, and operating policies common to a plurality of antivirus applications deployed on remote mobile devices;

retrieving, via the first administrative interface, from an administration database operatively connected to the administration server, one or more common application configuration settings, antivirus scan tasks, and operating policies common to the plurality of antivirus applications; and providing a plurality of administration console plug-in components, wherein each of said plug-in components is associated with one or more of said plurality of antivirus applications, and wherein a plug-in component is operable to provide:
- (i) a second administrative interface for configuring via the administration console one or more application-specific configuration settings, antivirus scan tasks, and operating policies specific to the one or more associated antivirus applications; and
- (ii) one or more web interfaces for communicating the one or more application-specific configuration settings, antivirus scan tasks, and operating policies to the associated antivirus applications, wherein the administration console has console options to view application information regarding configuration settings, antivirus scan tasks, and operating policies common to the plurality of antivirus applications, the administration console loads an application plug-in component to retrieve and localize the application information, and the administration console displays the localized application information.

2. The method of claim 1, wherein the common configuration settings include a network address of the administration server, antivirus libraries information, license key information, and types of notifications to be send to the administration server.

3. The method of claim 1, wherein the common antivirus scan tasks include frequency of antivirus updates and schedule of antivirus scans.

4. The method of claim 1, wherein the common operating policies include different types of events that should be reported by the antivirus applications to the administration server.

5. The method of claim 1, wherein wherein a web interface for communicating application-specific configuration settings comprises a Simple Object Access Protocol (SOAP) interface.

6. The method of claim 1, wherein a single administration console plug-in component is operable to control two or more compatible antivirus applications.

7. The method of claim 1, wherein the second administration interface is further operable to display statistics of operation of the associated antivirus applications.

8. An administration system for antivirus applications, the system comprising:
- an administration hardware server operable to administer and control a plurality of antivirus applications deployed on remote mobile devices, including administering application configuration settings, antivirus scan tasks, and operating policies common to the plurality of antivirus applications;
- an administration database operatively connected to the administration server, wherein the administration database is operable to store application configuration settings, antivirus scan tasks, and operating policies common to the plurality of antivirus applications;
- an administration console connected to the administration server, wherein the administration console is operable to provide a first administrative interface for configuring application configuration settings, antivirus scan tasks, and operating policies common to the plurality of antivirus applications; and
- a plurality of administration console plug-in components, wherein each of said plug-in components is associated with one or more of said plurality of antivirus applications, and wherein a plug-in component is operable to provide:
  - (i) a second administrative interface for configuring via the administration console application-specific configuration settings, antivirus scan tasks, and operating policies specific to the one or more associated antivirus applications, and
  - (ii) one or more web interfaces for communicating the one or more application-specific configuration settings, antivirus scan tasks, and operating policies to the associated antivirus applications, wherein the administration console has console options to view application information regarding configuration settings, antivirus scan tasks, and operating policies common to the plurality of antivirus applications, the administration console loads an application plug-in component to retrieve and localize the application information, and the administration console displays the localized application information.

9. The administration system of claim 8, wherein the common configuration settings include a network address of the administration server, antivirus libraries information, license key information, and types of notifications to be send to the administration server.

10. The administration system of claim 8, wherein the common antivirus scan tasks include frequency of antivirus updates and schedule of antivirus scans.

11. The administration system of claim 8, wherein the common operating policies include different types of events that should be reported by the antivirus applications to the administration server.

12. The administration system of claim 8, wherein a web interface for communicating application-specific configuration settings comprises a Simple Object Access Protocol (SOAP) interface.

13. The administration system of claim 8, wherein a single administration console plug-in component is operable to control two or more compatible antivirus applications.

14. The administration system of claim 8, wherein the second administration interface is further operable to display statistics of operation of the associated antivirus applications.

15. A computer program product embedded in a non-transitory computer-readable medium comprising computer-executable instructions for administering antivirus applications, the medium comprising instructions for:
- providing via an administration console of an administration server a first administrative interface for administering and controlling configuration settings, antivirus scan tasks, and operating policies common to a plurality of antivirus applications deployed on remote mobile devices;
- retrieving, via the first administrative interface, from an administration database operatively connected to the administration server, one or more common application configuration settings, antivirus scan tasks, and operating policies common to the plurality of antivirus applications; and
- providing a plurality of administration console plug-in components, wherein each of said plug-in components is associated with one or more of said plurality of antivirus applications, and wherein a plug-in component is operable to provide:
(i) a second administration interface for configuring via the administration console one or more application-specific configuration settings, antivirus scan tasks, and operating policies specific to the one or more associated antivirus applications; and
(ii) one or more web interfaces for communicating the one or more application-specific configuration settings, antivirus scan tasks, and operating policies to the associated antivirus applications, wherein the administration console has console options to view application information regarding configuration settings, antivirus scan tasks, and operating policies common to the plurality of antivirus applications, the administration console loads an application plug-in component to retrieve and localize the application information, and the administration console displays the localized application information.

16. The product of claim 15, wherein the common configuration settings include a network address of the administration server, antivirus libraries information, license key information, and types of notifications to be send to the administration server.

17. The product of claim 15, wherein the common antivirus scan tasks include frequency of antivirus updates and schedule of antivirus scans.

18. The product of claim 15, wherein the common operating policies include different types of events that should be reported by the antivirus applications to the administration server.

19. The product of claim 15, wherein a single administration console plug-in component is operable to control two or more compatible antivirus applications.

20. The product of claim 15, wherein the second administration interface is further operable to display statistics of operation of the associated antivirus applications.

* * * * *